United States Patent [19]

Roselli

[11] 4,261,534

[45] Apr. 14, 1981

[54] INFLATED WING AIRCRAFT

[76] Inventor: Auro Roselli, 319 E. 51st St., New York, N.Y. 10022

[21] Appl. No.: 951,080

[22] Filed: Oct. 13, 1978

Related U.S. Application Data

[63] Continuation-in-part of Ser. No. 786,638, Apr. 11, 1977, abandoned.

[51] Int. Cl.³ .......................... B64C 33/00; B64D 1/04
[52] U.S. Cl. ........................................ 244/22; 244/25; 244/64; 244/96; 244/31; 244/125; 55/521; 55/512; 239/2 R
[58] Field of Search .................. 244/2, 35, 5, 24–30, 244/31, 11, 22, 64, 96, 97, 98, 128, 125, 126, 127; 55/521, 512, 529, 422, 429; 202/185; 203/49; 239/2, 14

[56] References Cited

U.S. PATENT DOCUMENTS

| 23,163 | 3/1859 | Gaye | 244/31 |
|---|---|---|---|
| 1,247,960 | 11/1917 | Jelelian | 244/28 |
| 1,470,017 | 10/1923 | Lougheed | 244/35 R |
| 2,614,883 | 10/1952 | Anderson, Jr. et al. | 55/521 |
| 3,018,087 | 1/1962 | Steele | 126/270 |
| 3,153,878 | 10/1964 | Smith | 244/31 |
| 3,446,457 | 5/1969 | Struble | 244/30 |
| 3,534,907 | 10/1970 | Bellis | 239/2 R |
| 3,620,486 | 11/1971 | Charpentier | 244/33 |
| 3,753,539 | 8/1973 | Moore | 244/128 |
| 3,860,492 | 1/1975 | Lowi et al. | 203/49 |
| 3,944,169 | 3/1976 | Bede | 244/16 |
| 4,018,211 | 4/1977 | Barr | 126/270 |
| 4,053,122 | 10/1977 | Gar | 244/22 |

FOREIGN PATENT DOCUMENTS

| 306293 | 4/1913 | Fed. Rep. of Germany | 239/14 |
|---|---|---|---|
| 568062 | 12/1932 | Fed. Rep. of Germany | 244/22 |
| 452732 | 5/1913 | France | 244/96 |

*Primary Examiner*—Galen Barefoot
*Attorney, Agent, or Firm*—Natter & Natter

[57] ABSTRACT

An aircraft is constructed of an airfoil shaped inflated involucrum of lightweight gas-impervious plastic film. The airfoil is maneuverable to attain forward self-propulsion upon ascent as well as descent. The gases contained in the involucrum are heated by solar radiation to reduce craft density with the upper surface of the airfoil being translucent and the lower surface of the airfoil interior mirrored for concentration of the radiant energy upon an interior cylindrical black spar. A honeycomb reradiation barrier is provided beneath the translucent surface. In one embodiment a large volume involucrum is changeable in camber to maximize forward propulsion. The craft may be utilized to suspend a large fog broom for the purpose of condensation of water vapor. In a further embodiment a manpowered inflatable craft is formed with a flexible longitudinal medial fold which separates the airfoil into wing segments. Each segment includes a passive trailing zone. When the wing segments are oscillated about the medial fold, the craft is propelled by ciliary thrust.

16 Claims, 11 Drawing Figures

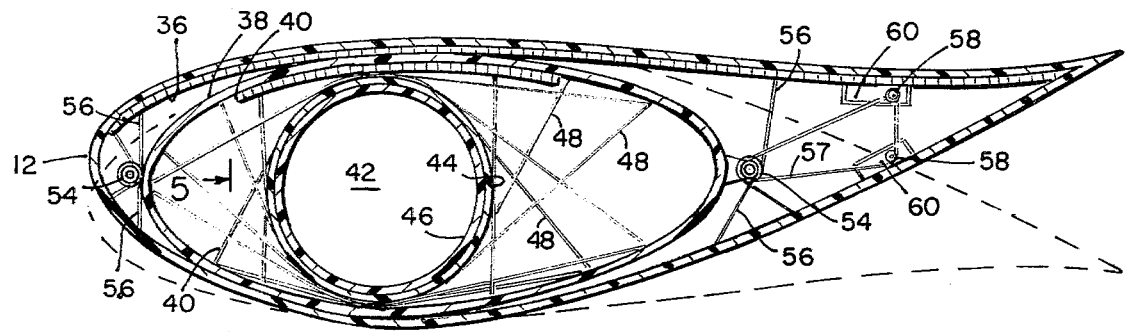
FIG. 4
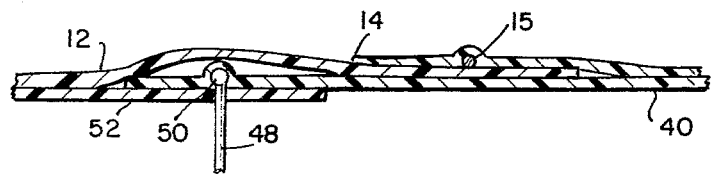
FIG. 5
FIG. 6
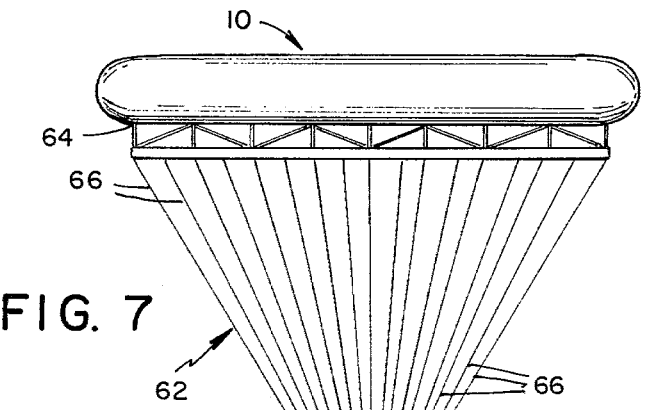
FIG. 7
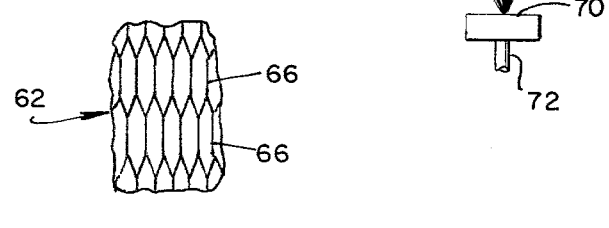
FIG. 8

INFLATED WING AIRCRAFT

RELATED APPLICATIONS

This application is a continuation in part of pending application Ser. No. 786,638 filed Apr. 11, 1977 entitled SOLAR WING AND ACCESSORIES, now abandoned.

BACKGROUND OF THE INVENTION

1. Field of the Invention

This invention relates generally to inflated wings.

2. Brief Description of the Prior Art

Early attempts at attaining forward propulsion as a result of the rise and fall of a lighter than air craft were exemplified in U.S. Pat. No. 23,163 issued to James P. Gage and U.S. Pat. No. 43,449 issued to Solomon Andrews. While the devices illustrated in the Gage patent were inoperable due to the impracticality of achieving such shapes in an inflated craft and maintaining buoyancy, Solomon Andrews did actually fly a lighter than air craft formed of a plurality of oblong cylindroids.

Unfortunately, the Andrews device did not meet with commercial success. This could possibly be due to the inefficiency in the materials employed in construction as well as the difficulties in controlling a multiple array of inflated cylindroids.

SUMMARY OF THE INVENTION

The invention comprises a lighter than air craft in the configuration of an elongate airfoil having a translucent upper surface to permit solar radiation to expand the contained gases. Reradiation of the solar energy is retarded by a honeycomb deflector positioned beneath the translucent surface. An internal elongate black spar is heated by the solar radiation, and a plurality of shaping cables extending tangentially from the spar fix the configuration of an elongate bladder within the airfoil. The external airfoil configuration is adapted to adjust its camber from a lighter than air mode (maintained during ascent of the aircraft to provide forward motion) to a heavier than air mode (to facilitate forward motion upon descent of the craft). For this purpose, a plurality of camber lines extend between rollers journalled at fixed points on the bladder to the interior of the airfoil involucrum.

A pendant fog broom may be suspended from the craft for the condensation of water vapor to dispel fog conditions or provide a low cost supply of water. In an alternate embodiment, a man powered aircraft includes an airfoil shaped inflated wing comprising two wing segments which are reciprocally oscillated about a medial axis by an operator. Each wing segment includes a passive trailing zone, the oscillations of which trail that of the corresponding wing segments to provide a foward ciliary force for propulsion of the craft.

From the above compendium, it will be appreciated that it is an object of the present invention to provide a lighter than air inflated craft of the general character described which is adapted for efficient low cost transportation.

A further object of the invention is to provide a lighter than air inflated craft which is adapted to provide forward propulsion on ascent and descent without the necessity for an external propulsion system.

Another object of the present invention is to provide a lighter than air inflated craft of the general character described having an airfoil shape and utilizing solar energy for the expansion of internal gases.

Another object of the present invention is to provide a lighter than air inflated craft of the general character described which includes an airfoil configuration and the camber of which is adjustable to maximize forward propulsion in both ascent and descent of the craft.

Yet another object of the present invention is to provide a lighter than air inflated craft of the general character described which includes a water vapor condensation broom suspended therefrom.

A still further object of the present invention is to provide an efficient man powered inflated aircraft which propels an operator utilizing operator generated ciliary thrust.

With these ends in view the invention finds embodiment in various combinations of elements and arrangements of parts by which the said objects and other objects are hereinafter attained, all as fully described with reference to the accompanying drawings and the scope of which is more particularly pointed out and indicated in the appended claims.

BRIEF DESCRIPTION OF THE DRAWINGS

In the following drawings in which some of the various exemplary embodiments of the invention are shown:

FIG. 4 is an enlarged sectional view through the involucrum, the same being taken substantially along the plane 4—4 of FIG. 1 and illustrating the spar and bladder from which a plurality of shaping lines are controlled to provide camber adjustment;

FIG. 5 is a greatly enlarged sectional view through the bladder and involucrum, the same being taken substantially along the line 5—5 of FIG. 4;

FIG. 6 is a side elevational view of a lighter than air inflated craft suspending an elongate finely stranded fog broom for the supply of water through a collection tube;

FIG. 7 is a front elevational view of the involucrum and fog broom shown in FIG. 6 with a portion of the collection tube broken away;

FIG. 8 is a greatly enlarged fragmentary elevational view of a segment of the fog broom wherein the condensing strands are of mesh configuration;

DESCRIPTION OF THE PREFERRED EMBODIMENTS

Figure 1:
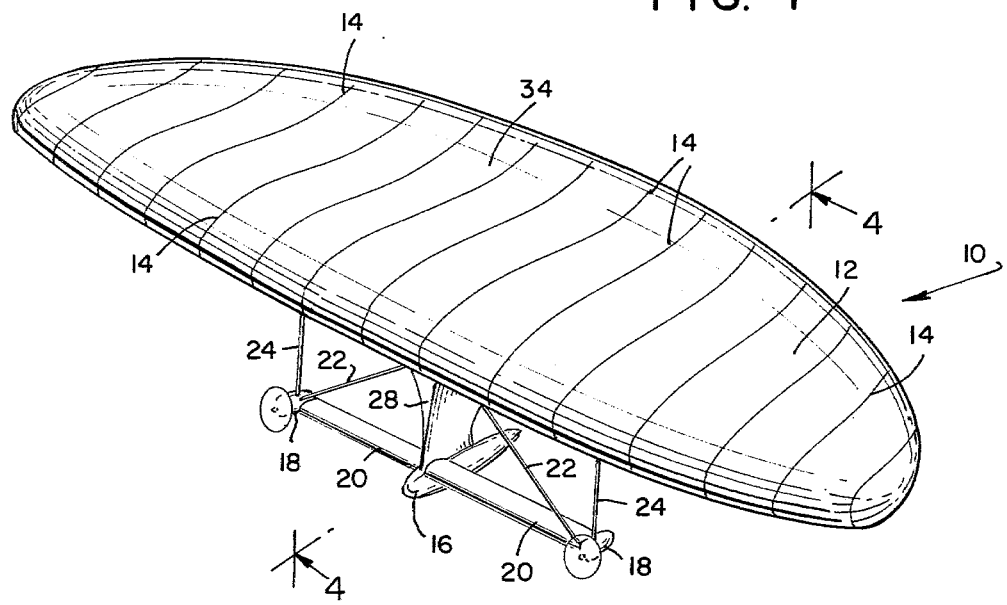
FIG. 1 is a perspective illustration of a typical lighter than air inflated craft constructed in accordance with and embodying the invention and showing an airfoil shaped elongate involucrum and a payload carrying a nacelle suspended therefrom.
Figure 2:
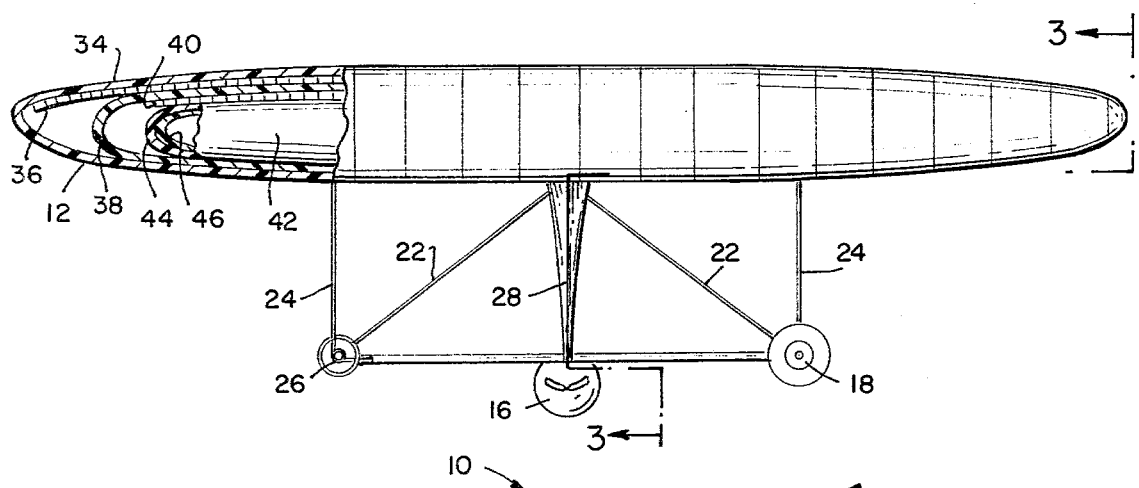
FIG. 2 is a front elevational view of the lighter than air inflated craft with a portion of the involucrum broken away to illustrate typical internal components thereof including a bladder and a spar.

Referring now in detail to FIG. 1 wherein the reference numeral 10 denotes generally a lighter than air craft constructed in accordance with and embodying the invention, it will be seen that the craft 10 includes an encapsulating involucrum 12 generally constructed in the configuration of an elongate airfoil. The involucrum 12 is typically formed of a lightweight gas impervious plastic film. Due to the large volume required for appropriate atmospheric displacement in order to achieve a buoyant force necessary to lift a payload, the involucrum 12 may be formed of a plurality of plastic film segments suitably joined at a plurality of parallel lapped seams 14. As shown in FIG. 5, a like plurality of circumscribing rib cables 15 are positioned to constrain the shape of the involucrum to the desired airfoil configuration. The rib cables are preferably engaged with the involucrum between overlapped layers at the seams 14.

Figure 3:
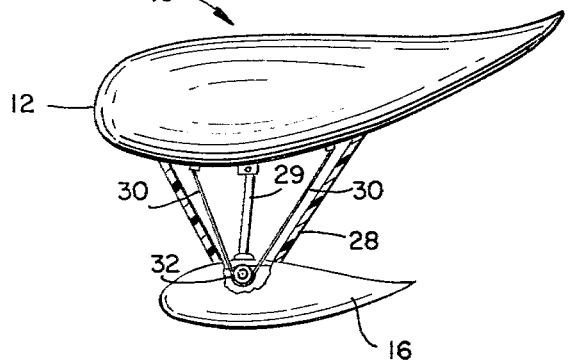
FIG. 3 is an auxiliary side elevational view taken substantially along the line 3—3 of FIG. 2 and through a flexible column interconnecting the involucrum and the nacelle and showing various control cables for controlling the attitude of the involucrum to obtain efficient forward propulsion.

As shown in FIGS. 3 and 4, the airfoil configuration incorporates in longitudinal section a blunt leading edge or nose and a tapered tail which terminates at a trailing edge.

A nacelle 16 is suspended beneath the involucrum 12 and is adapted to carry the payload and control the flight of the craft 10. Maneuverability of the craft is enhanced by a pair of auxiliary engines 18 controlled from the nacelle 16 and shown mounted to an engine beam 20 on opposite sides of the nacelle 16. In order to brace the engines 18, a diagonal brace cable 22 extends from the involucrum 12 to the housing of each of the engines 18.

As mentioned heretofore, a significant aspect of the present invention is to employ the airfoil configuration of the involucrum to develop forward self-propulsion upon ascent as well as descent of the craft 10. For this purpose, appropriate controls are provided between the involucrum 12 and the nacelle 16 to adjust the attitude of the involucrum for optimum efficiency. Among such controls is a lateral control line 24 which extends vertically from the undersurface of the involucrum 12 toward one of the engine housings and around a pulley 26 which may be journalled therein, through the mounting beam 20, the nacelle 16, and the symmetrical mounting beam and engine housing, thence upwardly to the undersurface of the opposite span of the involucrum. Tensile forces applied to this line 24 with reference to the nacelle will alter the lateral flex axis angle of the involucrum. It should be appreciated that such control could be achieved as a torque applied at one of the pulleys 26 or at a further pulley positioned in the nacelle 16. Further the control line 24 may include a rack segment and the torque applying pulley may include a pinion for direct driving engagement in the application of such tensile force to the control line 24.

As shown in FIG. 3, control of the angle of attack of the involucrum is achieved through an assembly concealed within a flexible column 28 which extends between the involucrum 12 and the nacelle 16. Within the column 28 a flexible pivoted linkage 29 extends between the involucrum and the nacelle to permit variations in the angles between the two components. Such angle variations are achieved by applying an appropriate tensile force to a control line 30 through a pulley or pinion 32 similar to the pulley 26 described heretofore.

In accordance with the present invention, the involucrum is designed to utilize solar radiation for the purpose of heating the gases contained therein to thereby increase the volumetric size of the involucrum until the density thereof provides a sufficient buoyancy to lift the payload. As the involucrum rises with the payload, the appropriate angle of the involucrum 12 provides forward motion.

The involucrum 12 includes a translucent upper surface 34 which permits the entry of solar radiation. The top 34 is translucent or limpid, however, the degree of transparency is a matter of design choice, the sole criterion being the maximum transmission of radiant energy into the involucrum. In order to retard reradiation of the received energy, a lightweight plastic honeycomb 36 is secured to the undersurface of the translucent top 34.

With reference now to FIG. 4 wherein details of the internal involucrum construction are shown, it should be appreciated that the involucrum 12 includes an internal elongate bladder 38 which may itself include a translucent upper surface and a reradiation barrier 40 in the form of a similar honeycomb panel.

The received solar radiation is partially absorbed in an elongate black body spar 42 which preferably assumes a relatively stiff cylindrical configuration extending the full span of the involucrum. The spar 42 may include a relatively stiff encapsulating skin 44 which surrounds an inner chamber 46. It should be appreciated that gases constrained within the inner chamber 46 will be of a significantly higher pressure than the gases of the bladder 38 due to the elevated temperature of the spar 42.

The bladder 38 is preferably gas impervious and configured with a generally elliptical cross section. The configuration of the bladder 38 is maintained by a multiplicity of shaping cables 48 which project tangentially from the spar skin 44 to the bladder. In a manner similar to that employed in the involucrum construction, the bladder 38 is formed of a plurality of seamed gas impervious lightweight sheets of plastic film and lapped seams 52 may be provided similar to the seams 14 previously shown. Additional constraints to fix the bladder's generally ellipse configuration are provided by a plurality of rib cables 50 which circumscribe its periphery and are positioned between the layers of each lapped seam 52. A typical shaping cable 48 extending between the bladder 38 and the spar 42 may form a juncture with a selected rib cable 50 between the lapped layers of film forming a seam 52 to maintain the gas impervious integrity of the bladder.

Solar radiation is transmitted through the translucent top 34 of the involucrum 12, the honeycomb 36, the translucent top of the bladder 38 and the bladder honeycomb. The lower portion of the bladder interior is formed with a mirrored surface, e.g. the bladder 38 may be formed of a mylar film reflectively coated. The interior of the bladder thus serves to direct the transmitted solar radiation at the black spar 42 to achieve an optimum heating of the spar. The spar heats the interior of the bladder to expand the gases therein.

It should be understood, however, that the configuration of the bladder is constrained by the shaping cables 48. When the bladder is pressurized relative to the involucrum, it assumes a relatively stiff configuration thereby providing a skeletal reference frame for the involucrum 12. Additionally, the interior undersurface of the involucrum 12 may also include a reflective coating and be formed of a mylar film to further concentrate the radiant energy of the bladder and spar and thereby obtain elevated temperatures for expansion of gases within the involucrum.

In accordance with the present invention, the involucrum is adapted to change the camber of its airfoil configuration between two modes, one of which optimizes forward propulsion when the craft 10 is lighter than air and ascending, and the other of which optimizes forward propulsion when the craft is heavier than air and descending.

Referring again to FIG. 4, the involucrum 12 therein shown in solid cross section is in a typical lighter than air configuration to provide forward propulsion while ascending. In such configuration the undersurface of the airfoil is convexly curved to a greater extent than the upper surface thereof.

Shown in dashed lines in FIG. 4 is an alternate configuration which is assumed by the involucrum 12 when the airfoil is in a heavier than air mode. In the heavier than air configuration the undersurface is curved to a lesser extent than the upper surface. The involucrum 12 changes between the two positions by controlled movement of the periphery thereof relative to the bladder which provides the reference frame for such movement.

At the forward and rear tips of the bladder 38, control wheel sets 54 are journalled for rotation in order to effect the camber adjustment. A plurality of control wheel sets 54 are spaced along the length of the bladder. Each control wheel set 54 includes multiple concentric steps, and to each of such steps a camber adjustment line 56 is fixed with the other end of each camber line 56 being secured to the involucrum 12. The camber lines are preferably joined to the involucrum at the control cables 15.

Because different areas of the involucrum are required to travel different distances between the two extreme modes of camber adjustment, the camber lines 56 which are fixed to involucrum zones or areas of minimal movement are joined at their opposite ends to the steps of each control wheel set 54 which are of relatively small diameter. On the other hand, camber lines which are fixed to areas of the involucrum which must undergo substantial movement are connected to steps of the control wheel set 54 which are of larger diameter. Motor or pulley actuation of the control wheel sets 54 effects the desired change in the involucrum configuration.

With respect to the tail section of the airfoil, one of the camber lines 57 is looped around a step of a rear control wheel 54 and interconnects a pair of opposed rollers 58 which may be slidable along a pair of mating track segments 60 to effect the desired tail configuration changes. It should be appreciated that the camber line arrangement illustrated herein for achieving the camber adjustment is merely exemplary of many possible approaches.

In order to lift suitable payloads, it should be understood that the involucrum 12 is of maximum practical volume, e.g. in the order of one million cubic feet; however such volume is merely exemplary. As volume increases by the cube of the linear dimensions of the craft 10, once a buoyant lifting range has been established relatively minor linear increases will result in greatly augmented lifting capacity.

In FIGS. 6 through 8 an involucrum 61 similar in construction and size to the involucrum 12 heretofore described is shown suspending a large fog broom 62 of generally triangular elevational configuration. The fog broom 62 is supported from a truss framework 64 mounted to the undersurface of the involucrum 61 and includes an elongate roll 66 upon which the fog broom 62 may be coiled for storage as well as during ascent and descent of the involucrum. The fog broom 62 is utilized for the purpose of condensing atmospheric water vapor to provide a supply of water for irrigation or other purposes and/or for the purpose of dispelling fog conditions.

The fog broom 62 includes a plurality of condensation strands and may comprise a suitable synthetic monofilament such as a polyamid. The strands converge from spaced locations at the upper end of the broom 62 toward a lower tip to which is joined a weighted liquid collector 70 which maintains the broom in a generally vertical position. A collection tube 72 may be employed as a conduit for the condensed water to be transmitted from the collector 70 to a suitable tank 74 positioned at ground level. The collection tube 72 may form a control line for the involucrum 61 as an alternative to utilizing a manned nacelle.

An alternate embodiment for the strand configuration of the fog broom 62 is illustrated in FIG. 8 wherein a fragment of fog broom is shown greatly magnified. The strands forming the broom of this embodiment may actually comprise a fine diamond-like mesh having interstices in the order of 1/64" or less.

Figure 9:
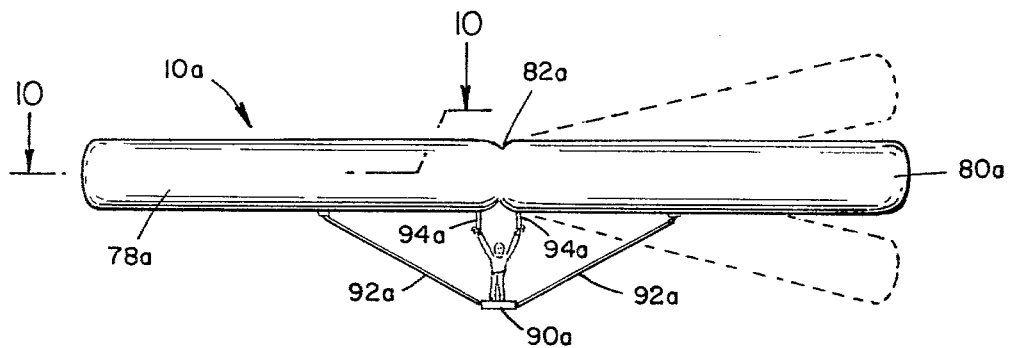
FIG. 9 is a front elevational view of an inflated wing manpowered aircraft construced in accordance with and embodying the invention.
Figure 10:
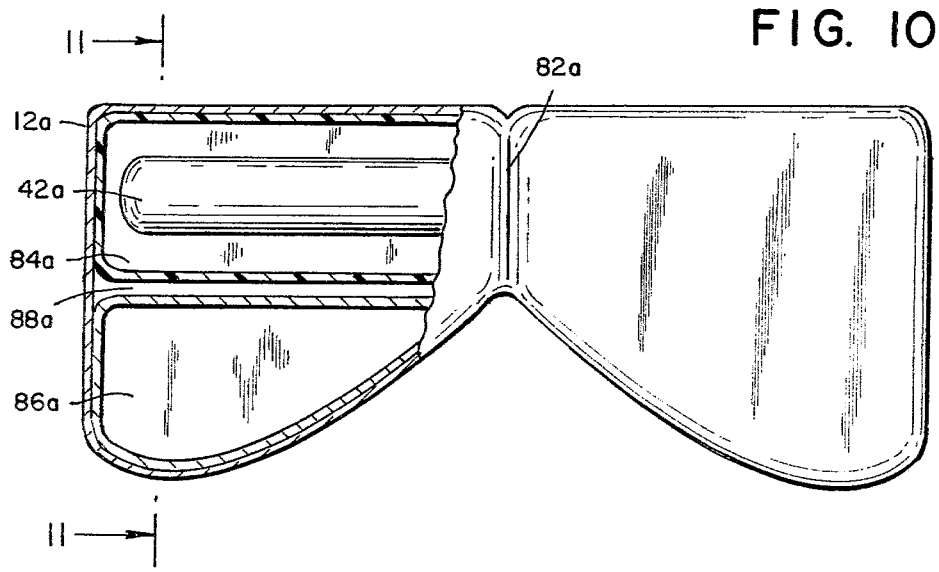
FIG. 10 is a plan view of the manpowered craft with a portion shown in section, the section being taken substantially along the line 10—10 of FIG. 9.
Figure 11:
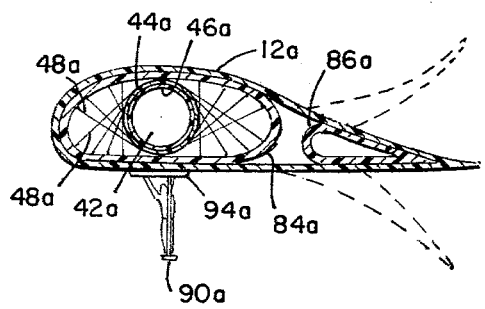
FIG. 11 is a sectional view through the involucrum, the same being taken substantially along the line 11—11 of FIG. 10 and showing an internal spar and bladder construction as well as a second bladder which defines a flexible passive trailing zone of a wing segment.

A further embodiment of the invention is illustrated in FIGS. 9 through 11 wherein like numerals denote like components of the embodiments heretofore disclosed, however bearing the suffix "a". In this embodiment, a man powered inflated aircraft 10a is disclosed. The man powered aircraft is of a much smaller size than the involucrums theretofore described having a volumetric capacity in the order of 6,500 cubic feet. The man powered aircraft 10a includes an involucrum 12a having right and left wing segments 78a, 80a respectively. A longitudinal flex axis 82a separates the wing segments. To facilitate beating the wing segments about the fold axis 82a, each of the wing segments 78a, 80a includes a separate forward bladder 84a and may additionally include a separate black body spar 42a.

The upper surface of the involucrum 12a and bladder 84a are preferrably translucent to permit the entry of solar radiation for the purpose of heating the spar 42a and gases contained within the bladder 84a and spar. The internal construction of the spar 42a and bladder 84a is substantially similar to that of the bladder and spar previously described with a plurality of shaping cables 48a extending tangentially from the spar to the bladder.

From an observation of FIG. 10 it will be seen that the trailing edge of the involucrum 12a flares outwardly with the minimum transverse dimension of the involucrum 12a found at the fold axis 82a with the longitudinal dimension of each of the wing segments being gradually enlarged toward the wing tips to provide a trailing zone. Additionally, a separate trailing bladder 86a is provided in each trailing zone. A gap between the forward bladder 84a and the trailing bladder 86a creates a lateral flex zone 88a such that the trailing zone of each wing segment will lag behind the leading edge thereof when the wing segments are caused to oscillate about the fold axis 82a by an operator. This lagging flexure, shown at opposite extremes in dashed lines of FIG. 11, generates a forward ciliary thrust to the craft when the wing segments are caused to oscillate to approximately the positions shown in dashed lines of FIG. 9.

The operator of the man powered inflated aircraft 10a is positioned beneath the fold axis 82a and under the craft and may be supported at a platform 90a which is in turn suspended from beneath the wing segments 78a, 80a by a pair of control lines 92a. A pair of operator handgrips 94a is provided. It should be appreciated that when the operator moves his body, bending his arms and knees, he will cause the wing segments to oscillate about the fold axis. Although the operator is shown controlling the wing segments from a substantially erect position, the control lines and platform may be varied for operation in a prone position.

The inflated involucrum 12a contains gases heated by solar energy and thus provides a degree of buoyancy to assist the operator who generates a lift force and propels the craft utilizing the ciliary thrust provided by the trailing sections of each of the wing segments.

Thus it will be appreciated that there is provided an inflated wing aircraft which achieves the various objects of the invention and which is well suited to meet the conditions of practical use.

As various changes might be made in the inflated craft as above set forth, it is to be understood that all matter herein described or shown in the accompanying drawings is to be interpreted as illustrative and not in a limiting sense.

Having thus described the invention, there is claimed as new and desired to be secured by Letters Patent:

1. An inflated wing aircraft comprising an elongate airfoil shaped involucrum, the involucrum having a rounded leading edge, a substantially tapered tail, an upper surface and an undersurface extending between the leading edge and the tail, the upper surface including means for permitting solar radiation to enter the involucrum, means within the involucrum for retarding heat loss through the upper surface, radiated solar energy entering the involucrum and heating gases contained therein, expanding such gases and thereby increasing the buoyancy of the craft, the involucrum further including an elongate cylindrical spar, means for concentrating the solar radiation on the spar, and means for maneuvering the craft to obtain forward propulsion upon both ascent and descent.

2. An inflated wing air craft constructed in accordance with claim 1 wherein the involucrum displaces a volume in the order of one million cubic feet.

3. An inflated wing aircraft constructed in accordance with claim 1 wherein the involucrum includes a pair of opposed wing segments, means providing a longitudinal flex axis between the wing segments, means for carrying an operator, control means interconnecting the operator with the wing segments for flexing the wing segments about the flex axis, each of the wing segments including means forming a lateral flex zone, an area of each wing segment between the flex zone and the tail flexing with respect to the wing segment and trailing the wing segment to provide ciliary forward thrust to the craft.

4. An inflated lighter than air craft comprising an elongate airfoil shaped involucrum, the involucrum having a rounded leading edge, a substantially tapered tail, an upper surface and an undersurface extending between the leading edge and the tail, the upper surface including means for permitting solar radiation to enter the involucrum, means within the involucrum for retarding heat loss through the upper surface, radiated solar energy entering the involucrum and heating gases contained therein, expanding such gases thereby increasing the buoyancy of the craft, means forming a bladder within the involucrum, the bladder containing gases, means pressurizing the gases within the bladder to a pressure greater than that of the gases contained within the involucrum, the bladder providing a skeletal support for the involucrum, the bladder being of generally elliptical cross sectional configuration, the craft further including means for adjusting the configuration of the involucrum relative to the bladder to vary the airfoil from a lighter than air mode to a heavier than air mode to maximize propulsion of the craft on both ascent and descent.

5. An inflated lighter than air craft constructed in accordance with claim 4 wherein the bladder includes a forward surface spaced from the leading edge of the involucrum, the means for adjusting the configuration including means for varying the position of the involucrum leading edge relative to the forward surface of the bladder.

6. An inflated lighter than air craft constructed in accordance with claim 4 further including means for permitting solar radiation to enter the bladder to heat the gases contained therein.

7. An inflated wing air craft constructed in accordance with claim 4 further including an elongate cylindrical spar, the spar being positioned within the bladder and containing gases, means pressurizing the gases within the spar to a pressure greater than that of the gases contained within the bladder, means extending between the spar and the bladder for supporting the bladder in a desired configuration.

8. An inflated lighter than air craft constructed in accordance with claim 4 wherein a means for adjusting the configuration includes means for varying the position of the involucrum tail relative to the bladder.

9. An inflated wing aircraft comprising an elongate airfoil formed of a lightweight plastic involucrum, the involucrum having a relatively blunt rounded leading edge, a substantially tapered tail, an upper surface and an undersurface extending between the leading edge and the tail, the width of the involucrum exceeding the distance between the leading edge and the tail, the upper surface including a translucent zone for permitting solar radiation to enter the involucrum, means within the involucrum for retarding reradiation of energy through the upper surface, radiated solar energy entering the involucrum and heating gases contained therein, expanding such gases and thereby increasing the buoyancy of the craft, the volumetric capacity of the involucrum being in the order of one million cubic feet, means for changing the airfoil shape from a lighter than air mode to a heavier than air mode, and means for maneuvering the craft to obtain forward propulsion upon both ascent and descent.

10. An apparatus for condensing water from water vapor, the apparatus comprising a large fog broom, the fog broom comprising means for condensing atmospheric water vapor, the condensing means including a multiplicity of strands and means supporting the strands from an elevation above ground level, the strands being spaced from one another adjacent the supporting means and converging toward one another at the lower ends thereof, the apparatus further including a liquid collector positioned at the area of strand convergance, water vapor being condensed on the strands and draining to the collector.

11. An apparatus constructed in accordance with claim 10 further including conduit means and reservoir means, the conduit means extending between the collecting means and the reservoir means.

12. An apparatus constructed in accordance with claim 10 wherein the strands are assembled in a mesh configuration.

13. An apparatus constructed in accordance with claim 10 further including an inflated aircraft, the aircraft comprising an elongate airfoil shaped involucrum, the means supporting the strands interconnecting the strands and the aircraft, strand storage means, the storage means carrying the strands during ascent of the craft and permitting the strands to extend downward after the craft has reached the desired altitude.

14. A man powered inflated aircraft for propelling an operator in the absence of external motive power, the craft comprising an elongate involucrum, the involucrum including a pair of opposed wing segments, each of the wing segments having a rounded leading edge and a tapered tail, means providing a central longitudinal flex axis between the wing segments, means for carrying an operator adjacent the wing segments, control means interconnecting the operator with the wing segments for oscillating the wing segments about the flex axis at a period of oscillation, the control means comprising means interconnecting an upper body extremity of the operator with the wing segments adjacent the longitudinal flex axis and means interconnecting a lower body extremity of the operator with the wing segments spaced outwardly from the upper extremity interconnecting means, each of the wing segments including means forming a lateral flex zone, the tail of each wing segment flexing with respect to the remainder of each wing segment to provide ciliary forward thrust to the craft when the wing segments are oscillated.

15. A man powered inflated craft constructed in accordance with claim 14 wherein the upper surface of each wing segment includes means for permitting solar radiation to enter the involucrum whereby the gases contained therein will be heated and expanded.

16. An inflated man powered aircraft constructed in accordance with claim 14 wherein the means forming the lateral flex axis includes means segregating each wing segment into discrete chambers.

* * * * *